United States Patent [19]

Atkins

[11] Patent Number: 4,673,706

[45] Date of Patent: Jun. 16, 1987

[54] POLYESTER MOLDING COMPOSITIONS

[75] Inventor: Kenneth E. Atkins, S. Charleston, W. Va.

[73] Assignee: Union Carbide Corporation, Danbury, Conn.

[21] Appl. No.: 879,536

[22] Filed: Jun. 24, 1986

Related U.S. Application Data

[63] Continuation of Ser. No. 706,908, Mar. 1, 1985, abandoned, which is a continuation of Ser. No. 237,697, Feb. 24, 1981, abandoned.

[51] Int. Cl.⁴ ............................................. C08G 63/76
[52] U.S. Cl. ..................................... 525/31; 525/111
[58] Field of Search .................................. 525/111, 31

[56] References Cited

U.S. PATENT DOCUMENTS

| | | | |
|---|---|---|---|
| 3,701,748 | 10/1972 | Kroekel | 260/40 |
| 3,786,004 | 1/1974 | Furuya | 525/111 |
| 3,793,398 | 2/1974 | Hokamura | 525/111 |
| 3,997,627 | 12/1976 | Ichimura | 260/862 |
| 4,374,215 | 2/1983 | Atkins | 525/168 |

FOREIGN PATENT DOCUMENTS 55-118912  9/1980  Japan ................................. 525/111

OTHER PUBLICATIONS

Encyclopedia of Polymer Science and Technology, pp. 209-216, vol. 6, 1967.

J. Brandrup et al, Polymer Handbook, 2nd ed, p. II-319, John Wiley & Sons, New York, (1975).

*Primary Examiner*—Melvyn I. Marquis
*Attorney, Agent, or Firm*—Paul W. Leuzzi

[57] ABSTRACT

The addition of cross-linkable vinyl monomers and epoxy compounds to low shrinking polyester molding compositions containing unsaturated polyesters results in moldings with improved surface characteristics.

19 Claims, No Drawings

POLYESTER MOLDING COMPOSITIONS

This application is a continuation of prior U.S. application Ser. No. 706,908, filing date 3/1/85, which is a continuation of application Ser. No. 237,697, filing date 2/24/81, now both abandoned.

BACKGROUND OF THE INVENTION

This invention pertains to improved polyester molding compositions and more particularly to those having improved surface characteristics.

A technical improvement that has made a significant contribution to commercial polyester molding technology is the use of low profile additives to reduce shrinkage during the curing reaction, and to thereby improve dimensional stability and surface smoothness. Low profile additives are thermoplastic polymers such as vinyl acetate polymers, polystyrene, acrylic polymers, and polycaprolactones. There are a number of theories that seek to explain the low profile or anti-shrinkage action of these polymers, but the one that seems to best explain the phenomenon is the following:

The low profile additive is at least partly soluble in the uncured polyester/styrene solution. As the polyester/styrene mixture crosslinks, the thermoplastic polymer becomes incompatible or less soluble and at least partly comes out of solution. This action causes a volume expansion that compensates for the shrinkage that occurs when the polyester/styrene mixture crosslinks.

The development of low-profile unsaturated polyester compounds has led to a wide acceptance of these materials by the transportation industry because of their good surface appearance, dimensional stability, physical properties, assembly consolidation and potential weight savings. However, as new applications developed standards have been raised making it desirable for even better surface appearance and the elimination of ripples and waviness that sometimes develop, particularly in relatively large appearance sensitive areas.

There is, therefore, a need to provide low profile unsaturated polyester compounds which afford improved surface appearance in the molded parts obtainable therefrom.

U.S. patent application Ser. No. 194,069 filed in the name of Kenneth E. Atkins on Oct. 16, 1980, now U.S. Pat. No. 4,374,215, and titled "Improved Polyester Moldings" describes a polyester molding composition comprising (a) a polyester resin comprising the reaction product of an olefinically unsaturated dicarboxylic acid or anhydride and a polyol;

(b) an olefinically unsaturated monomer that is copolymerizable with said polyester resin;

(c) a thermoplastic polymer low-profile additive to control shrinkage; and (d) an effective amount of a second crosslinkable vinyl monomer having a reactivity ratio with styrene of greater than 1.

The addition of component (d) in said U.S. patent application Ser. No. 194,069 is stated to result in moldings with improved surface characteristics.

U.S. patent application Ser. No. 194,070 filed in the name of Kenneth E. Atkins et al. on Oct. 16, 1980, now abandoned, and titled "Improved Polyester Fiber Reinforced Molding Compounds" describes a composition comprising:

(a) a thermosetting polyester resin;

(b) an olefinically unsaturated monomer that is copolymerizable with polyester resins;

(c) a thermoplastic low profile additive for shrinkage control; and (d) a thermosetting epoxy resin containing at least one 1,2-epoxy group per molecule.

The addition of component (d) in said U.S. patent application Ser. No. 194,070 is stated to result in moldings having improved surface appearance.

DESCRIPTION OF THE INVENTION

It has now been found that compositions containing both a second crosslinkable vinyl monomer having a reactivity ratio with styrene of greater than 1 and a thermosetting epoxy resin containing at least one 1,2-epoxy group per molecule results in moldings having improved surface appearance as compared to those compositions containing either of said additives.

The improved composition of this invention comprises:

(a) a thermosetting polyester resin, (b) an olefinically unsaturated monomer that is copolymerizable with the polyester resin;

(c) a thermoplastic low profile additive for shrinkage control (d) an effective amount of a second cross-linkable vinyl monomer having a reactivity ratio with styrene of greater than 1, and (e) a thermosetting epoxy resin containing at least one 1,2-epoxy group per molecule.

Thermosetting polyester resins suitable for use in accordance with the invention are polyester resins that are reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta-to at least one of the carboxylic acid groups. Such acids include maleic acid or anhydride, fumaric acid, methylmaleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydride, adipic acid, isophthalic acid, and "dimer" acid (i.e., dimerized fatty acids).

A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications, such as, dicyclopentadiene modified resins are known in the art and are described in U.S. Pat. No. 3,933,757 and U.S. Pat. No. 3,883,612 incorporated herein by reference.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, with contain the characteristic linkages and terminal, polymerizable unsaturated groups, are fully disclosed in U.S. Pat. No. 3,887,515 to Pennington et al along with the preparation of such resins and further description of these well known resins is unnecessary herein.

The curable compositions of the invention also contain a monomer that contains ethylenic unsaturation, and which is copolymerizable with the polyester and terminally unsaturated vinyl ester resins. Styrene is the preferred monomer in commercial practice today, although others can be used.

The said monomer is also employed in the resin composition for the purpose of dissolving the thermosetting resin (which is a solid at ambient temperatures, i.e., about 20°-25° C.) to ensure that the resin composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the monomer are normally found within the range of from about 25 to about 70, and preferably 40 to 55, weight percent, based on weight of thermosetting polyester resin plus monomer, plus thermoplastic additive.

When desired a thickening agent can also be employed in the compositions of the invention. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, plus monomer, plus low profile additive.

Alternatively a dual thickening system may be employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present. Reference is made to Belgium Pat. No. 849,135 to Epel et al. for a description of such dual thickening systems.

An essential component of the compositions of the invention are thermoplastic low profile additives. In one aspect, the low profile additives that may be employed in the invention are thermoplastic polymers of vinyl acetate, saturated thermoplastic polyesters, and mixtures of the same. In another aspect of the invention, the low profile additive that may be employed are thermoplastic polyalkyl methacrylate polymers.

Suitable thermoplastic vinyl acetate polymer low profile additives are poly(vinyl acetates) homopolymers and thermoplastic copolymers containing at least 50 weight percent vinyl acetate. Such polymers include, for example, vinyl acetate homopolymer; carboxylated vinyl acetate polymers including copolymers of vinyl acetate and ethylenically unsaturated carboxylic acids, such as acrylic acid, methacrylic acid, crotonic acid, maleic acid, fumaric acid, itaconic acid and the like or anhydrides such as maleic anhydride; vinyl acetate/vinyl chloride/maleic acid terpolymer, and the like. Reference is made to U.S. Pat. No. 3,718,714 to Comstock, et al. and British Pat. No. 1,361,841 to Comstock, et al. for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in proportions of from about 5 to 25, and preferably from about 9 to 16, weight percent, based on weight of polyester plus thermoplastic, plus monomer.

Suitable thermoplastic saturated polyester low profile additives are, in general, low molecular weight saturated polymers of polymerizable linear and/or cyclic esters and carboxylated saturated polymers of said polymerizable esters having at least one carboxyl group per molecule.

Polymers of linear and/or cyclic esters, including carboxylated polymers having an average of at least one carboxyl group per molecule which may be used in accordance with the present invention are those which possess a reduced viscosity of at least about 0.1, and preferably from about 0.15 to about 15 and higher. The preferred polymers of cyclic esters have a reduced viscosity of about 0.2 to about 10.

Suitable polymers are further characterized by the following basic recurring structural Unit I

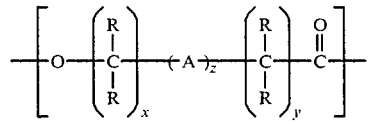

wherein each r, which can be the same or different, is hydrogen, halogen, i.e. chlorine, bromine, iodine, or fluorine, or a monovalent hydrocarbon radical generally containing a maximum of 12 carbon atoms, and preferably containing a maximum of eight carbon atoms. A is an oxy group; x is an integer having a value of 1 to 4 inclusive, y is an integer having a value of 1 to 4 inclusive, z is an integer having a value of 0 or 1, with the proviso that (a) the sum of x+y+z is 4 to 6 inclusive and (b) the total number of R variables which are substituents other than hydrogen does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

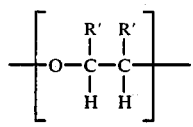

Unit II wherein each R', is as defined for R of Unit I, or in which the two R' variables together with the ethylene moiety of the oxyethylene chain of Unit II form a saturated cycloaliphatic hydrocarbon ring having from four to eight carbon atoms inclusive. It is preferred that recurring Unit II contains from two to twelve carbon atoms inclusive. The interconnection of Unit I and Unit II does not involve or result in the direct bonding of two oxy groups i.e., —O—O—.

Particularly preferred polymers of cyclic esters are those which are characterized by the oxypentamethylenecarbonyl chain as seen in basic recurring structural Unit III

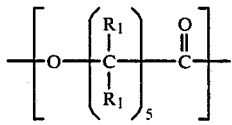

Unit III wherein each $R_1$ is hydrogen or lower alkyl, that is alkyl having a maximum of 4 carbon atoms, with the proviso that no more than three $R_1$ variables are substituents other than hydrogen.

Thermoplastic saturated polymers of linear and/or cyclic esters are well known and the carboxylated saturated esters are well known and such thermoplastic saturated polymers, and particularly polymers prepared from epsiloncaprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters.

Also included are polyesters based on diacids, such as adipic acid, and diols, such as 1,6-hexanediol. These polyesters are described in, for example, U.S. Pat. Nos. 3,909,483; 3,994,853; 3,736,278; and 3,929,868.

The thermoplastic saturated polyester low profile additives may usually be employed in the compositions of the invention in proportions similar to those of thermoplastic vinyl acetate polymers, i.e., in proportions from about 5 to 25 weight percent, and preferably from about 10 to 20 weight percent, based on the weight of polyester, plus thermoplastic polymer, plus monomer.

Also suitable in certain aspects of the invention are thermoplastic polyalkyl acrylate or methacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, polystyrene, styrene copolymers, such as, styrene/butadiene copolymers, cellulose acetate butyrate, alkylene oxide polymers, and the like.

Molecular weight of the alkyl acrylate or methacrylate polymers useful in the invention may vary over a wide range, from 10,000 to 1,000,000, and preferably from 25,000 to 500,000.

The thermoplastic polymer should be present in amounts ranging from 1 to 25 percent by weight, based on the weight of polyester, plus low profile additive, plus monomer, and preferably from 5 to 20 percent by weight.

An optional component of the compositions of the invention is a viscosity reducing agent. In one aspect the invention employs, generally in combination with thermplastic vinyl acetate polymer and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{12}$), myristic ($C_{14}$), palmitic ($C_{16}$), palmitoleic ($C_{16}$), stearic ($C_{18}$), oleic ($C_{18}$), linoleic ($C_{18}$), linolenic ($C_{18}$), and the like acids, and the acids may be either straight chain or branched chain. Products in which mixtures of acids of the foregoing kind occur, such as tall oil acid, may be used.

The viscosity reducing agent can be present in amounts ranging from 0.4 to about 6 weight percent, and preferably from about 1 to 4 weight percent, based on the combined weight of thermosetting resin, copolymerizable monomer, and low profile additive.

The epoxy compounds of this invention can be based on aliphatic, cycloaliphatic or aromatic backbones. Thus for example are included the bisphenol A based epoxy resins.

One class of preferred thermosetting epoxy resins can be represented by the formula:

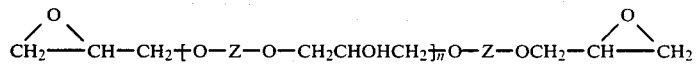

wherein n is an integer representing the number of repeating units and has a value of 0 to about 10 and Z is an arylene radical having 6 to about 20 carbons. The preferred arylene radical is:

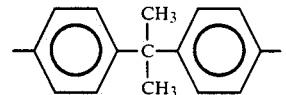

Still another preferred class of thermosetting epoxy resins are the 1,2-cycloaliphatic diepoxides. They are exemplified by the following:

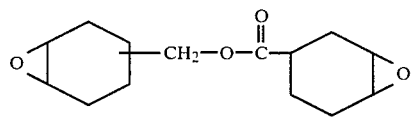

3,4-epoxycyclohexylmethyl 3,4-epoxycyclohexane carboxylate

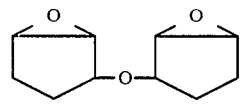

bis(2,3-epoxycyclopentyl)ether

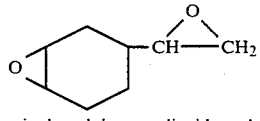

vinyl cyclohexene dioxide and

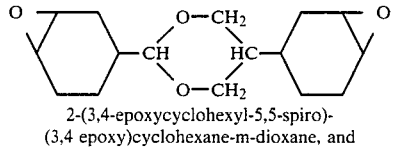

2-(3,4-epoxycyclohexyl-5,5-spiro)-
(3,4 epoxy)cyclohexane-m-dioxane, and

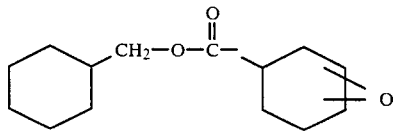

A general description of the preparation of thermosetting epoxy resins is presented in the Encyclopedia of Polymer Science and Technology, pp. 209-216, Vol. 6, Interscience Publishers, N.Y.C. 1967, which is incorporated herein by reference.

A representative example of an aliphatic epoxy compound is epoxidized polybutadiene.

Also included herein are epoxidized oils, such as epoxidized soybean oil, tung oil, linseed oil and the like, as well as octyl epoxytallate, epoxidized pentaerythritol tetratallate, and the like.

While the amount of epoxy compound used in the practice of the invention is not narrowly critical, it is preferred to use about 1 to about 25 parts per hundred parts of polyester resin plus unsaturated monomer plus low profile additive and even more preferred about 2 to 10 parts per hundred.

The secondary crosslinkable monomer suitable for use in the present invention has a reactivity ratio with styrene of greater than 1, preferably greater than 5, and most preferably greater than 20.

Measuring the reactivity ratios of monomers is well known in the art as described, for example, in F. W. Billmeyer, Jr., *Textbook of Polymer Science,* Wiley-Interscience, pages 329-331.

The monomer reactivity ratios $r_1$ and $r_2$ are the ratios of the rate constant for a given radical adding its own monomer to that for its adding the other monomer. Thus $r_1 > 1$ means that the radical $M_1$ prefers to add $M_1$; $r_1 < 1$ means that it prefers to add $M_2$. In the system styrene ($M_1$)-methyl methacrylate ($M_2$), for example, $r_1 = 0.52$ and $r_2 = 0.46$; each radical adds the other monomer about twice as fast as its own. Thus, methyl methacrylate is unsatisfactory in the molding compositions of this invention.

The following Table lists representative styrene-monomer reactivity ratios.

| Monomer-1 | Monomer-2 | $r_1$ | $r_2$ |
| --- | --- | --- | --- |
| Styrene | Diethylfumarate | 0.30 | 0.07 |
| | Diethylfumarate | 0.400 | 0.0905 |
| | Methyl Methacrylate | 0.52 | 0.46 |
| | Methyl Methacrylate | 0.59 | 0.536 |
| | Vinyl Acetate | 55 | 0.01 |
| | Vinyl Methyl Ether | 100 | 0.01 |
| | Vinyl Ethyl Ether | 90 | 0 |
| | Vinyl Nonanoate | 49.5 | 0.01 |
| | Vinyl Octadecanate | 68 | 0.01 |
| | Vinyl Stearate | 68 | 0.01 |
| | Vinyl Undecanoate | 29 | 0.02 |
| | Allyl Acetate | 90 | 0.00 |
| | Diallylphthalate | 328 | 0.057 |
| | Diethyl maleate | 6.52 | 0.005 |
| | Ethyl 2-Ethoxyacrylate | 23.5 | ~0 |
| | Vinyl trimethoxysilane | 22 | 0 |

Other monomers suitable for use in this invention include vinyl norbornene, vinyl stearate, butyl vinyl ether, diallyl phthalate, octene-1, octene-2, vinyl cyclohexene, bicyclononadiene, dicyclopentadiene, and the following:

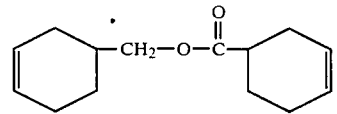

The polyester molding composition may also contain one or more of the known types of conventional additives, which are employed for their known purposes in the usual amounts. The following are illustrative of such additives:

1. Polymerization initiators such as t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester plus monomer plus low profile additive;

2. Fillers such as clay, hydrated alumina, silica, calcium carbonate and others known to the art;

3. Reinforcing fillers such as glass fibers or fabrics, asbestos fibers or fabrics, various organic fibers or fabrics such as those made of polypropylene, acrylonitrile/vinyl chloride copolymer, and others known to the art; and 4. Mold release agents or lubricants, such as zinc stearate, calcium stearate, and others known to the art.

5. Rubbers or elastomers such as (a): homopolymers or copolymers of conjugated dienes having a weight average molecular weight of 30,000 to 400,000 or higher as described in U.S. Pat. No. 4,020,036. The conjugated dienes contain from 4-12 carbon atoms per molecule such as 1,3-butadiene, isoprene, and the like; (b) epihalohydrin homopolymers, a copolymer of two or more epihalohydrin monomer, or a copolymer of an epihalohydrin monomer(s) with an oxide monomer(s) having a number average molecular weight (Mn) which varies from about 800 to about 50,000 as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/-norbornadiene, as described in U.S. Pat. No. 4,161,471; (e) conjugated diene butyl elastomers, such as copolymers consisting of from 85 to 99.5% by weight of a $C_4$-$C_7$ isolefin combined with 15 to 0.5% by weight of a conjugated multi-olefin having 4 to 14 carbon atoms, copolymers of isobutylene and isoprene where a major portion of the isoprene units combined therein have conjugated diene unsaturation as described in U.S. Pat. No. 4,160,759.

Once formulated, the compositions can be molded into thermoset articles of desired shape, particularly thermoset articles such as automobile fenders, dashboards and the like. The actual molding cycle will, of course, depend upon the exact composition being molded as well as upon the nature of a particular cured product desired. Suitable moldings cycles are conducted at temperatures of the order of about 100° C. to about 182° C. for periods of time ranging from about 0.5 minutes to about 5 minutes.

The shrinkage data molding conditions for making $12'' \times 12'' \times \frac{1}{8}''$ plaques were two minutes at 148° C. and 800 psi unless otherwise.

The molding viscosities were measured on paste samples containing all of the ingredients except the fiberglass using a Brookfield HBT 5X Viscometer TF spindle at 5 rpm.

EXPERIMENTAL SECTION

General Procedure for Preparation of Sheet Molding Compound (SMC) Formulations All the liquid components were weighed individually into a 5 gallon open top container placed on a Toledo balance. The contents of the container were then mixed (in a hood) with a high speed Cowles type dissolver. The agitator was started at a slow speed, then increased to medium speed to completely mix the liquids over a period of 2-3 minutes. The mold release agent, if one is desired, was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and ~175 grams of the paste was removed from the container and transferred to a wide-mouthed 4 oz. bottle. The paste sample was stored in the capped bottle at room temperature and the viscosity measured periodically using a Model HBT 5X Brookfield Synchro-Lectric Viscometer on a Helipath Stand.

The balance of the paste is next added to the doctor boxes on the SMC machine where it is further combined with fiber glass (~1" fibers). The sheet molding compound (SMC) is then allowed to mature to molding viscosity and then molded into the desired article.

Hood Scoops

Hood Scoops designed like miniature automobile hoods and containing a number of ribs and bosses of varying sizes was used to determine "sink", surface smoothness and overall moldability of sheet molding compound formulations containing surface improvers. The hood scoop contains a large triangular boss (~1.9" base ~3.8".high) and 3 circular bosses (~0.4", ~0.9", ~1.4" diameter). It also contains a number of ribs of varying thickness and with different lead in radii.

Visual observations of these hood scoops as molded and after painting with a gloss black paint enables one to compare "sink" over the ribs and bosses, craze cracking, surface smoothness, glass pattern, laking and overall moldability. The hood scoop mold is installed in a 200 Ton Lawton hydraulic press. The molds contain ejector pins for release of the molded part and are heated with circulating oil. The male core is installed in the bottom of the press and the female cavity at the top. Temperatures of the two molds are controlled separately. Pressure of the press can be varied up to 200 Ton with variable time cycles so that the same part can be molded at several pressures. The speed at which the press closes can also be varied as well as the cure cycle for the molded part. All of these were varied during the molding of SMC formulations containing the surface improvers. Placement of the change pattern on the male core mold was also varied. The molded hood scoop was allowed to cool and was then evaluated.

DESCRIPTION OF THE MATERIALS

BAKELITE LP-40A. A product of Union Carbide Corporation which is a copolymer of vinyl acetate and acrylic acid (40 weight percent) dissolved in styrene (60 weight percent).

Snowflake. A calcium carbonate filler sold by Thompson-Weimann, Inc. having a mean particle size of 5 microns.

Modifier M. A 33 weight percent dispersion of magnesium oxide in an unsaturated polyester carrier vehicle sold by USS Chemicals/Polyester Unit.

PDO. A 50% dispersion of tert-butylperoctoate in dioctyl phthalate sold by the Lucidol Division of Pennwalt Corp.

BAKELITE VR-3. A mixture of commercial fatty acids sold by Union Carbide Corporation.

USS-13031. A highly reactive unsaturated polyester resin believed to be ortho-phthalic anhydride modified containing approximately 40 weight percent of styrene sold by USS Chemicals Polyester Unit. 70 parts per million of parabenzoquinone, based on the polyester were added.

OCF-951. A fiberglass roving chopped to desired length on the sheet molding compound machine and sold by Owens Corning Fiberglass Corp.

ERL-4221.

| | Epoxide No. (Eq. Wt.) | Functionality |
|---|---|---|
| (structure) | 131–143 | 2 |

11

TABLE I

| Formulation No. | SMC Formulations | | | |
|---|---|---|---|---|
|  | 1 | 2 | 3 | 4 |
| USS-13031 | 65 | 65 | 65 | 65 |
| Bakelite LP-40A | 35 | 35 | 35 | 35 |
| Vinyl acetate | — | 3 | 3 | 2 |
| ERL-4221 | — | — | 3 | 2 |
| Snowflake | 150 | 150 | 159 | 155 |
| t-butyl perbenzoate | 0.7 | 0.7 | 0.7 | 0.7 |
| t-butyl peroctoate (50%) | 0.6 | 0.6 | 0.6 | 0.6 |
| Zinc stearate | 2 | 2 | 2 | 2 |
| Bakelite Viscosity reducer VR-3 | 2 | 2 | 2 | 2 |
| Modifier M | 2.7 | 2.7 | 2.7 | 2.7 |
| Fiberglass (1 inch) wt. % | ← 27-28 → | | | |
| Molding Viscosity, MM cps (Brookfield HBT-5X Viscometer T-F/5 rpm) | 25.6 | 24.0 | 25.6 | 22.8 |

Two techniques were used in preparing the formulation for molding. In one technique the polyethylene was removed and the charge immediately put into the mold and the press closed for molding. In the second technique by polyethylene was removed from the charge and it was allowed to stand uncovered at room temperature (about 25° C.) for thirty minutes (weathering) and then charged to the mold. This type of weathering often occurs in molding plants when charges are prepared for part productions.

The SMC formulations were then molded into the hood scoops, described supra. About 800 grams of the SMC formulations were molded at about 1000 psi with the cavity temperature about 305° F. and a core temperature of about 295° F. The cure time was about two minutes.

The molded parts were painted with a high gloss automotive lacquer, baked and then evaluated visually for surface smoothness and appearance.

The surface evaluations for the moldings made from charges immediately introduced to the mold were evaluated and are listed as from best to worst in Table II.

TABLE II

| Formulation No. | Vinyl acetate (parts) | Epoxide (parts) | |
|---|---|---|---|
| 4 | 2 | 2 | Best |
| 3 | 3 | 3 | |
| 2 | 3 | — | |
| 1 | — | — | Worst |

The surface evaluations of the moldings made from charges which were weathered were compared with the surface of moldings made with unweathered material.

The results are shown in Table III.

TABLE III

| Formulation No. | Vinyl acetate (parts) | Epoxide (parts) | Comments |
|---|---|---|---|
| 1 | — | — | Surface much worse after weathering. |
| 2 | 3 | — | Surface worse after weathering but not as bad as formulation 1. |
| 3 | 3 | 3 | Surface somewhat better after weathering. |
| 4 | 2 | 2 | Surface slightly worse after weathering. |

What is claimed is:

1. An improved low profile additive molding composition comprising
   (a) a thermosetting polyester resin,
   (b) from about 25 to 70 weight percent of a first crosslinkable vinyl monomer that is crosslinkable with the polyester resin,
   (c) from about 1 to 25 weight percent of a thermoplastic low profile additive for shrinkage control,
   (d) an effective amount of a second crosslinkable vinyl monomer having a reactivity ratio with styrene of greater than 1, and
   (e) from 1 to 25 weight percent of a thermosetting epoxy compound containing at least one 1,2-epoxy group per molecule, said epoxy compound being selected from the group consisting of
   (1) 3,4-epoxycyclohexylmethyl 3,4-epoxycyclohexane carboxylate,.
   (2) 3-(3,4-epoxycyclohexane)-8,9-epoxy-2,4,-dioxaspiro[5.5]-undercane,
   (3) bis(3,4-epoxy-cyclohexylmethyl)adipate,

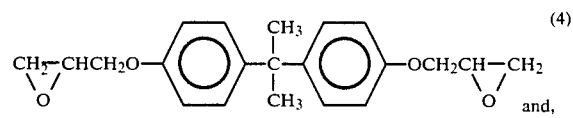

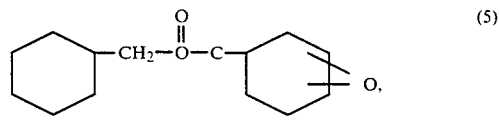

all weights being based on the combined weight of components (a), (b), and (c).

2. Composition claimed in claim 1 wherein the second vinyl monomer has a reactivity ratio with styrene of greater than 5.
3. Composition claimed in claim 1 wherein the second vinyl monomer has a reactivity ratio with styrene of greater than 20.
4. Composition claimed in claim 1 wherein the second vinyl monomer is vinyl acetate.
5. Composition claimed in claim 1 wherein the second vinyl monomer is vinyl stearate.
6. Composition claimed in claim 1 wherein the second vinyl monomer is vinyl norbornene.
7. Composition claimed in claim 1 wherein the second vinyl monomer is dicyclopentadiene.
8. Composition claimed in claim 1 wherein the second vinyl monomer is butyl vinyl ether.
9. Composition claimed in claim 1 wherein the second vinyl monomer is diallyl phthalate.
10. Composition claimed in claim 1 wherein the second vinyl monomer has the formula:

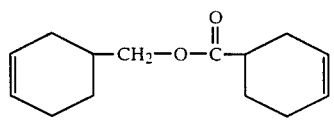

11. Composition claimed in claim 1 containing a thickening amount of a chemically active thickening agent.

12. Composition claimed in claim 11 wherein the thickening agent is magnesium oxide.

13. Composition claimed in claim 1 wherein the low profile additive is a polyvinyl acetate.

14. Composition claimed in claim 11 containing a carboxylated polyvinyl acetate low profile additive.

15. Composition claimed in claim 1 containing a reinforcing filler.

16. Composition claimed in claim 15 wherein the reinforcing filler is glass fiber.

17. Composition claimed in claim 1 containing a rubber or elastomer.

18. A molded article produced from the composition of claims 1 or 11 or 13 or 15 or 16 or 17.

19. An improved low profile additive molding composition comprising (a) a thermosetting polyester resin, (b) from about 25 to 70 weight percent of a first crosslinkable vinyl monomer that is crosslinkable with the polyester resin, (c) from about 1 to 25 weight percent of a thermoplastic low profile additive for shrinkage control, (d) an effective amount of a second crosslinkable vinyl monomer having a reactivity ratio with styrene of greater than 1, and (e) from 1 to 25 weight percent of a thermosetting epoxy compound containing at least one 1,2-epoxy group per molecule, said epoxy compound being selected from the group consisting of (a) epoxidized pentaerythritol tetratallate, (b) epoxidized soy bean oil, (c) octyl epoxytallate, and (d) epoxidized linseed oil, all weights being based on the combined weight of components (a), (b) and (c).

* * * * *